United States Patent Office 2,957,765

Patented Oct. 25, 1960

2,957,765

METHOD OF AND COMPOSITION FOR PREPARING LITHOGRAPHIC PRINTING PLATES

Alfred W. Resetich, Birmingham, Mich., assignor to General Aniline & Film Corporation, New York, N.Y., a corporation of Delaware No Drawing. Filed June 13, 1957, Ser. No. 665,601

4 Claims. (Cl. 96—1)

This invention relates to the production of lithographic printing from a print made by an electrostatic duplicating process.

Electrostatic duplicating processes are known at the present time and, in general, may be said to consist of the application to a base sheet of a photoconductive material in a suitable binder, which coating is then made light-sensitive by an electrostatic charge imparted thereto. The electrostatically charged light-sensitive sheet is then exposed in a conventional manner under a suitable original to be duplicated, thereby dissipating the electrostatic charge in those portions of the coating exposed to the light and leaving an electrostatic image of the image portion of the original. This image is then developed by the application of a developer powder of opposite electrical charge to the electrostatic image, and the visible image may then be fixed to the coating by the application of heat or solvent fumes or in some other manner.

In the above described electrostatic duplicating process, the photoconductive material must be capable of holding an electrical charge in the absence of light and must lose such charge when exposed to light. One such photoconductive material used in the electrostatic process is zinc oxide. The zinc oxide or other photoconductive material is coated onto the base in a solution including a resinous binder of high dielectric strength, such as a silicone resin. Other binders possessing the required dielectric properties may be used. The electrostatic image is developed or made visible by a developer powder dusted or otherwise applied onto the surface. The developer powder may consist of a colored resin or other suitable material which is hydrophobic and which may be readily wetted by the ink used in the lithographic process. The electrostatic duplicating process is completed by fixing the developer powder to form a permanent image.

Prints produced from the above described electrostatic process are not generally satisfactory if an attempt is made to use them directly as a lithographic master plate. It is difficult, if not impossible, to obtain clear differentiation between the image areas and the non-image areas due to the fact that the non-image areas are not sufficiently hydrophilic and therefore will be wetted to some extent by the ink used in the lithographic process.

The present invention is directed to a method of and a composition for use in preparing a print made by the electrostatic duplicating process, for use as a lithographic master plate. I have discovered that a print produced as described above can be made suitable for use as a lithographic master by the application thereto of a conversion solution which renders the non-image areas of the print hydrophilic, without adversely affecting the hydrophobic qualities of the image areas, thus obtaining a clear differentiation between the image and the non-image areas and rendering such plates capable of commercial use as lithographic masters.

The invention is applicable to prints made from any suitable base material such as paper, fabric, or metal and to prints produced by the electrostatic process in which certain of the compositions employed in such process and referred to above may be varied as conditions may require.

It is a principal object of this invention to provide an improved method of producing a lithographic printing plate.

It is a further object of the invention to provide a method of producing a lithographic printing plate from a print made by the electrostatic process.

Another object of the invention is to provide a composition of matter applicable to a print made by the electrostatic duplicating process to prepare the same for use as a lithographic printing plate.

Another object of the invention is to provide an improved method and composition of matter for converting an electrostatically produced print into a lithographic master plate.

I have found that, when a print made by the electrostatic duplicating process in which the photoconductive material is zinc oxide in a resinous binder of high dielectric strength, which coating forms the non-image areas of the finished print, is subsequently treated with an aqueous solution of certain of the acid phosphates and an aliphatic alcohol, the non-image areas will be made highly water-receptive while the image areas retain their hydrophobic characteristics, thus rendering such print entirely satisfactory for use as a lithographic master. I prefer to use as a conversion solution an aqueous solution of monobasic ammonium acid phosphate and an aliphatic alcohol of low molecular weight, such as propanol, isopropanol, ethanol or methanol. The invention also includes within its scope the use of a monobasic acid phosphate of an alkali metal in place of ammonium phosphate.

The conversion solution has been used to produce satisfactory lithographic plates when made in the following proportions: 5 to 20 parts by weight of the monobasic ammonium or alkali metal acid phosphate dissolved in a solvent consisting of 1 to 20 parts aliphatic alcohol and the balance water. The solution may be applied to the print by a cotton swab or by brushing, rolling or any other suitable method. The print is now suitable for use as a lithographic printing plate. It appears that a lithographic plate prepared in this manner and dried may be stored for some time without deterioration and without destroying the hydrophilic properties of the non-image areas.

*Example I*

A paper base print was prepared from a conventional original by the electrostatic duplicating process in which the photoconductive material initially coated onto the paper base was zinc oxide. The finished print was prepared for use as a lithographic master plate by applying to the surface thereof a conversion solution. The conversion solution was prepared by dissolving 10 grams of monobasic ammonium acid phosphate in 100 cc. of a solvent consisting of 10 cc. isopropanol and the balance water. The solution thus obtained was swabbed onto the surface of the print with a cotton swab. The plate thus formed was characterized by a marked differentiation between the image areas and the non-image areas, and used as a masterplate in a lithographic printing apparatus and produced 1000 copies of commercial quality.

*Example II*

A conversion solution was prepared by dissolving 5 grams of monobasic sodium acid phosphate in a solvent consisting of 5 cc. methanol and 95 cc. water. This conversion solution was swabbed onto the surface of a paper base print which was produced by a commercial electrostatic duplicating process. The plate was then used as a lithographic master plate and produced 1,000 copies of commercial quality.

Variations or modifications of the processes and compositions described herein will be apparent to those skilled in the art and may be made without departing from the scope of the present invention.

I claim:

1. The method of treating the non-image areas of the surface of a master plate produced by the electrostatic process to render it suitable for use in lithographic printing which areas are composed of a photoconductive insulated layer comprising a dispersion of zinc oxide in a hydrophobic silicone resin binder, the image areas of which plate are formed of a hydrophobic electrostatically attractable resinous powder, in order to render said non-image areas hydrophilic without affecting the hydrophobic properties of said image areas, which comprises contacting said non-image areas with a conversion solution consisting essentially of 1 to 20 parts by weight of a lower aliphatic monohydric alcohol, 5 to 20 parts by weight of a monobasic acid phosphate selected from the class consisting of an ammonium acid phosphate and an alkali metal acid phosphate and the remainder water.

2. The method as recited in claim 1 wherein said alcohol is isopropyl alcohol.

3. The method as recited in claim 1 wherein said monobasic acid phosphate is sodium acid phosphate.

4. The method as recited in claim 1 wherein the monobasic acid phosphate is ammonium acid phosphate.

References Cited in the file of this patent

UNITED STATES PATENTS

| | | |
|---|---|---|
| 1,977,646 | Rowell | Oct. 23, 1934 |
| 2,003,268 | Wescott | May 28, 1935 |
| 2,134,165 | Wescott | Oct. 25, 1938 |
| 2,297,691 | Carlson | Oct. 6, 1942 |
| 2,357,809 | Carlson | Sept. 12, 1955 |
| 2,766,118 | Sus et al. | Oct. 9, 1956 |

FOREIGN PATENTS

| | | |
|---|---|---|
| 203,907 | Australia | Nov. 1, 1956 |

OTHER REFERENCES

The Technical Digest, February 1948, pages 33 and 34.

R.C.A. Review, December 1954, pages 469 and 470.

Sugarman: The American Pressman, November 1955, pages 33–38.

UNITED STATES PATENT OFFICE

CERTIFICATION OF CORRECTION

Patent No. 2,957,765 October 25, 1960

Alfred W. Resetich

It is hereby certified that error appears in the above numbered patent requiring correction and that the said Letters Patent should read as corrected below.

Column 1, line 16, after "printing" insert -- plates --.

Signed and sealed this 30th day of May 1961.

(SEAL)
Attest:

ERNEST W. SWIDER
Attesting Officer

DAVID L. LADD
Commissioner of Patents